United States Patent
Oseko et al.

(10) Patent No.: US 7,994,440 B2
(45) Date of Patent: Aug. 9, 2011

(54) ELECTRONIC WEIGHING SCALE INCLUDING LOAD CELL MOUNTED IN CUP COMPONENT

(75) Inventors: Naoshi Oseko, Tokyo (JP); Kazuma Inoue, Tokyo (JP)

(73) Assignee: Tanita Corporation, Itabashi-ku, Tokyo (JP)

( * ) Notice: Subject to any disclaimer, the term of this patent is extended or adjusted under 35 U.S.C. 154(b) by 354 days.

(21) Appl. No.: 12/337,661

(22) Filed: Dec. 18, 2008

(65) Prior Publication Data

US 2009/0183928 A1    Jul. 23, 2009

(30) Foreign Application Priority Data

Jan. 17, 2008  (JP) .................................. 2008-008540

(51) Int. Cl.
*G01G 21/00*    (2006.01)
*G01G 21/28*    (2006.01)
(52) U.S. Cl. ...................................................... 177/238
(58) Field of Classification Search .................. 177/211, 177/229, 238–244
See application file for complete search history.

(56) References Cited

U.S. PATENT DOCUMENTS

| | | | |
|---|---|---|---|
| 4,800,973 A | 1/1989 | Angel | |
| 5,869,788 A | 2/1999 | Gordon et al. | |
| 5,886,302 A | 3/1999 | Germanton et al. | |
| 5,929,391 A | 7/1999 | Petrucelli et al. | |
| 6,417,466 B2 * | 7/2002 | Gross et al. | 177/211 |
| 6,563,059 B2 * | 5/2003 | Lee | 177/177 |
| 2001/0014777 A1 | 8/2001 | Serizawa et al. | |
| 2003/0089531 A1 | 5/2003 | Montagnino et al. | |
| 2004/0238236 A1 * | 12/2004 | Linglin et al. | 177/229 |
| 2005/0241415 A1 | 11/2005 | Germanton | |
| 2008/0217074 A1 * | 9/2008 | Kodaka et al. | 177/211 |
| 2008/0271931 A1 | 11/2008 | Weichao | |

FOREIGN PATENT DOCUMENTS

| | | |
|---|---|---|
| EP | 0050250 A2 | 4/1982 |
| JP | 2001-228013 A | 8/2001 |
| WO | WO 03/021208 A1 | 3/2003 |
| WO | WO 2007/085146 A1 | 8/2007 |

OTHER PUBLICATIONS

Office Action issued in the corresponding European Patent Application No. 08 171 466.9-1236 dated Mar. 11, 2010.

* cited by examiner

*Primary Examiner* — Randy W Gibson
(74) *Attorney, Agent, or Firm* — Buchanan Ingersoll & Rooney PC (57) ABSTRACT

Aimed at providing an electronic weighing scale possibly thinned overall, an electronic weighing scale disclosed herein has a top plate component allowing on the top surface thereof placement of an object to be weighed; and load cell units supporting the top plate component from the lower side thereof, wherein the top plate component is provided with mounting holes so as to extend therethrough in the thicknesswise direction, allowing therein attachment of cup components each having an opening opened downward, and each load cell unit is attached inside each cup component.

8 Claims, 6 Drawing Sheets

FRAGMENTARY VIEW TAKEN ALONG ARROW A-A ent is configured by attaching weight sensor units (load cell units) to through-holes provided to an inner stage, and by supporting an outer stage (top plate component) allowing thereon placement of an object to be weighed by the load cell units from the bottom side.
ELECTRONIC WEIGHING SCALE INCLUDING LOAD CELL MOUNTED IN CUP COMPONENT This application is based on Japanese patent application No. 2008-008540 the content of which is incorporated hereinto by reference.

BACKGROUND

1. Technical Field

The present invention relates to an electronic weighing scale measuring mass of an object to be weighed, placed on the top surface of a top plate component, using load cell units.

2. Related Art

Many of general electronic weighing scales are configured as supporting a top plate component from the bottom side thereof, using four sets or around of load cell unit. Dead weight of an object to be weighed placed on the top plate component is loaded to these load cell units in a distributed manner. By summing up the measured values detected by the individual load cell units, mass of the object to be weighed may be measured.

The load cell unit is generally configured to have a plurality of strain gauges bonded to a sensing part of so-called strain generator. Known types of the strain generator include diaphragm type, shear beam type and so forth. These strain generators stand on a common ground in that the sensing part generates strain corresponding to load applied thereto. When dead weight of an object to be weighed is applied to the strain generator to thereby induce strain in the sensing part, amount of the strain is measured and converted into an electric signal by the strain gauge, thereby load of the object to be weighed applied to the individual load cell units may be determined.

Figure 6A:
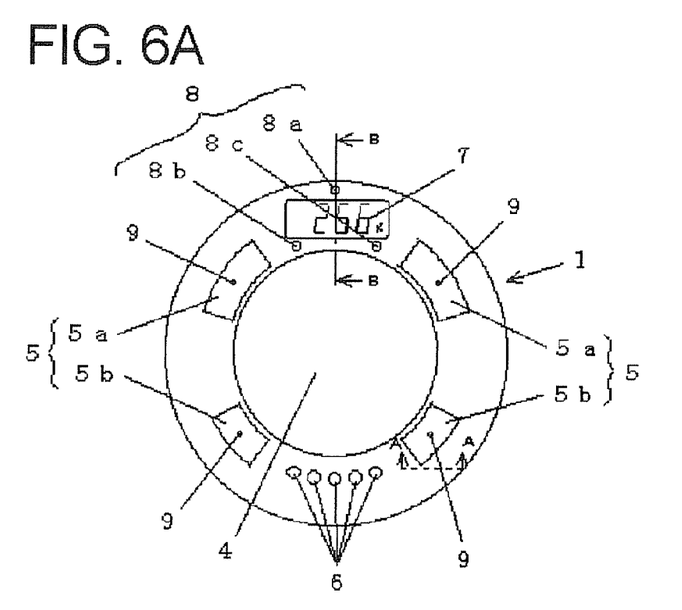
FIGS. 6A, 6B and 6C are drawings showing appearances of a conventional weighing scale.
Figure 6B:
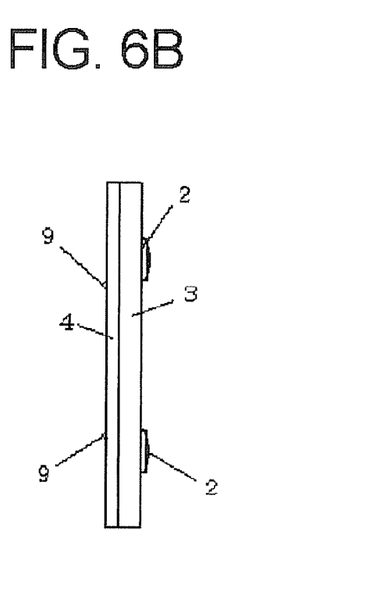
Figure 6C:
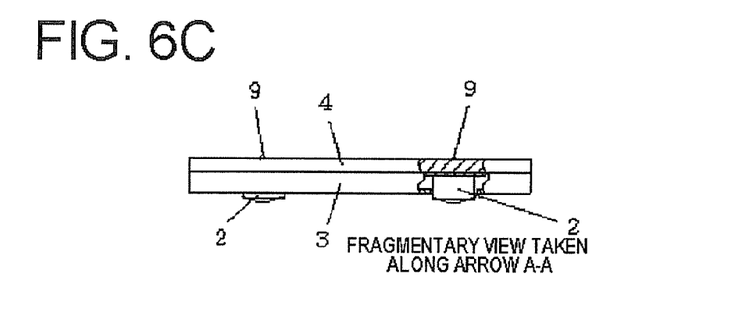

In relation to this sort of invention, there has been known a measuring instrument typically described in Japanese Laid-Open Patent Publication No. 2001-228013. FIGS. 6A to 6C are drawings showing an appearance of this conventional measuring instrument. The conventional measuring instrument is configured by attaching weight sensor units (load cell units) to through-holes provided to an inner stage, and by supporting an outer stage (top plate component) allowing thereon placement of an object to be weighed by the load cell units from the bottom side.

There has been steadily growing demands for thinning of recent electronic weighing scales.

Thinning of the electronic weighing scales is advantageous in terms of improvement in space factor and transportability when they are placed upright or laid flat. Thinning of the electronic weighing scale further raises a large merit of allowing aged people, children and so forth to step on and step off more easily, when they are weighed.

In contrast to this, the conventional electronic weighing scale exemplified by the Japanese Laid-Open Patent Publication No. 2001-228013 could be thinned only to a limited degree, because the overall height of the electronic weighing scale was specified by a total thickness of at least height of the load cell units and thickness of the top plate component.

The present invention is conceived after considering the above-described problem, and is to provide an electronic weighing scale possibly be thinned.

SUMMARY

According to the present invention, there is provided an electronic weighing scale having a top plate component allowing on the top surface thereof placement of an object to be weighed such as human or article; and a load cell unit supporting the top plate component from the lower side thereof, wherein the load cell unit is attached to the top plate component, while embedding at least a portion thereof in the top plate component.

By attaching the load cell unit while embedding it in the top plate component as described in the above, the overall thickness of the electronic weighing scale may be reduced from the total thickness of the top plate component and height of the load cell unit, by thickness corresponding to the depth of embedding of the load cell unit.

In the electronic weighing scale of the present invention, the top plate component may be provided with a mounting hole allowing therein attachment of the load cell unit so as to embed at least a portion thereof.

In the electronic weighing scale of the present invention, the mounting hole may be a through-hole extending through the top plate component in the thickness-wise direction.

The electronic weighing scale of the present invention may further include a cup component, having an opening opened downward and being attached inside the mounting hole, wherein the load cell unit is attached inside the cup component.

In the electronic weighing scale of the present invention, the cup component may have a bottomed cylinder portion having an opening opened downward, and a flange portion provided around the opening, and the cup component may be attached so that the cylinder portion is embedded in the mounting hole, and so that the flange portion is brought into contact with the lower surface of the top plate component.

In the electronic weighing scale of the present invention, the top plate component may be made of a tempered glass.

The electronic weighing scale of the present invention may have six or more sets of the load cell unit disposed in a distributed manner, wherein each load cell unit is attached to the top plate component, while embedding at least a portion thereof in the top plate component.

It is not always necessary for various constituents of the present invention to be articles independent from each other, and instead, a plurality of constituents may be formed as a single component, a single constituent may be formed by a plurality of components, a certain constituent may be a part of other constituent, and a part of a certain constituent may be owned in common by other constituent as a part thereof.

Because the load cell unit in the electronic weighing scale of the present invention is attached to the top plate component, while embedding at least a portion thereof in the top plate component, the overall height of the electronic weighing scale may be reduced from the total of thickness of the top plate component and height of the load cell unit, and thereby the scale may be thinned.

Therefore, an electronic weighing scale, excellent in space factor and transportability, allowing easy step-on and step-off for aged people and children, and not causative of tripping-on at the time of weighing of body, may be provided.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENT

The invention will be now described herein with reference to an illustrative embodiment. Those skilled in the art will recognize that many alternative embodiments can be accomplished using the teachings of the present invention and that the invention is not limited to the embodiment illustrated for explanatory purposes.

A first embodiment of the present invention will be explained below, referring to FIGS. 1A to 4.

First, an outline of an electronic weighing scale 10 of this embodiment will be explained.

Figure 1A:
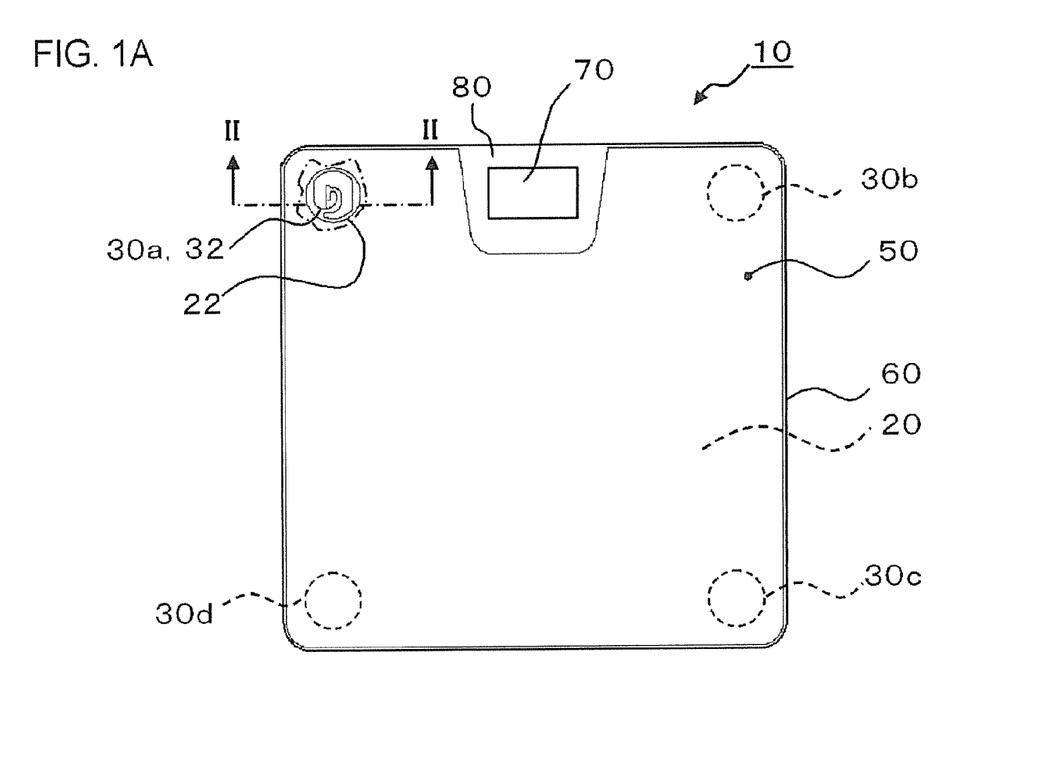
FIGS. 1A and 1B are schematic plan view and elevational view, respectively, of an electronic weighing scale according to a first embodiment of the present invention.
Figure 1B:
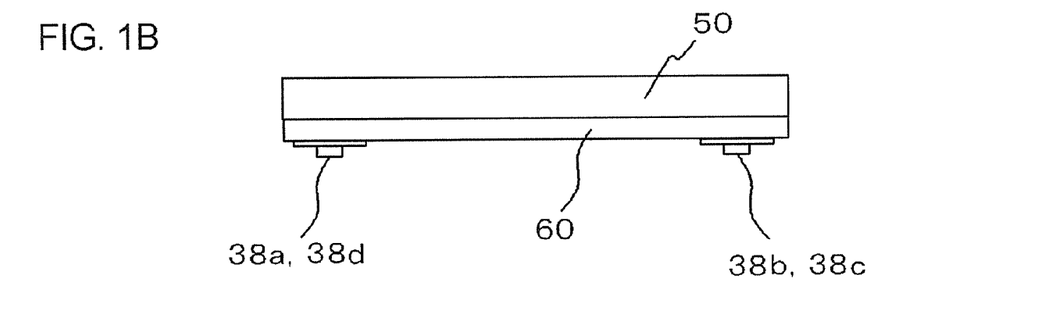

The electronic weighing scale 10 has a top plate component 20 allowing on the top surface thereof placement of an object to be weighed (not shown), and load cell units 30 supporting the top plate component 20 from the lower side thereof, wherein each of the load cell units 30 is attached to the top plate component 20, while embedding at least a portion thereof in the top plate component 20.

Next, the electronic weighing scale 10 of this embodiment will be detailed.

FIG. 1A is a schematic plan view of the electronic weighing scale 10, and FIG. 1B is an elevational view. It is to be noted that, in FIG. 1A, a portion of a cover sheet 50 is cut away so as to expose one of mounting holes 22, and so as to show only a strain generator 32 of a load cell unit 30a provided on the upper left of the drawing, without illustrating cup components 40.

Figure 2:
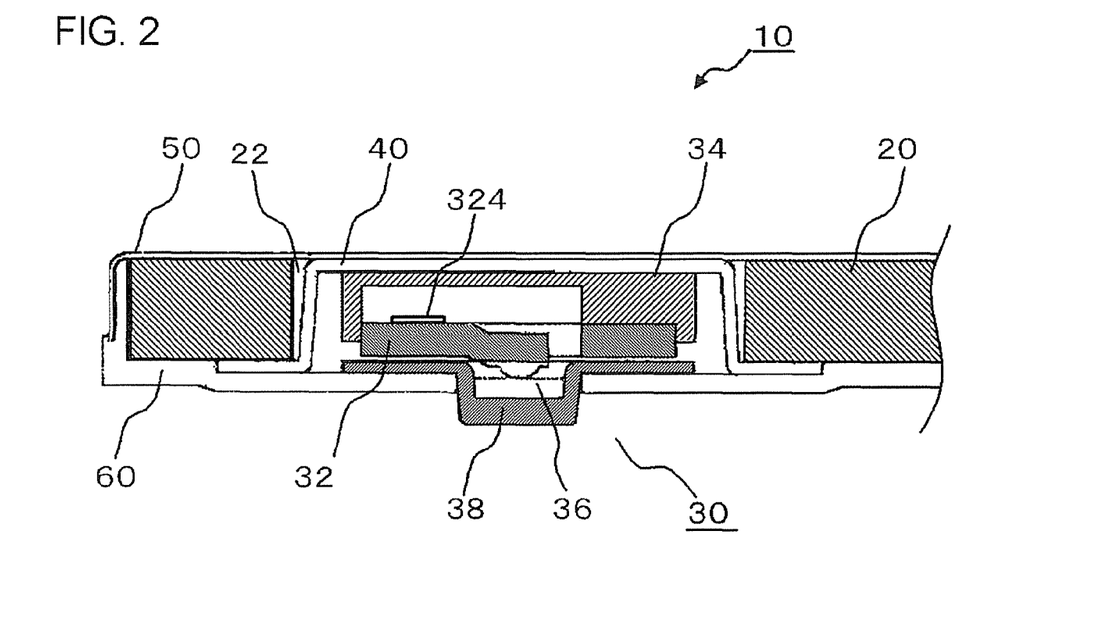
FIG. 2 is a fragmentary view taken along arrow II-II in FIG. 1A.
Figure 3:
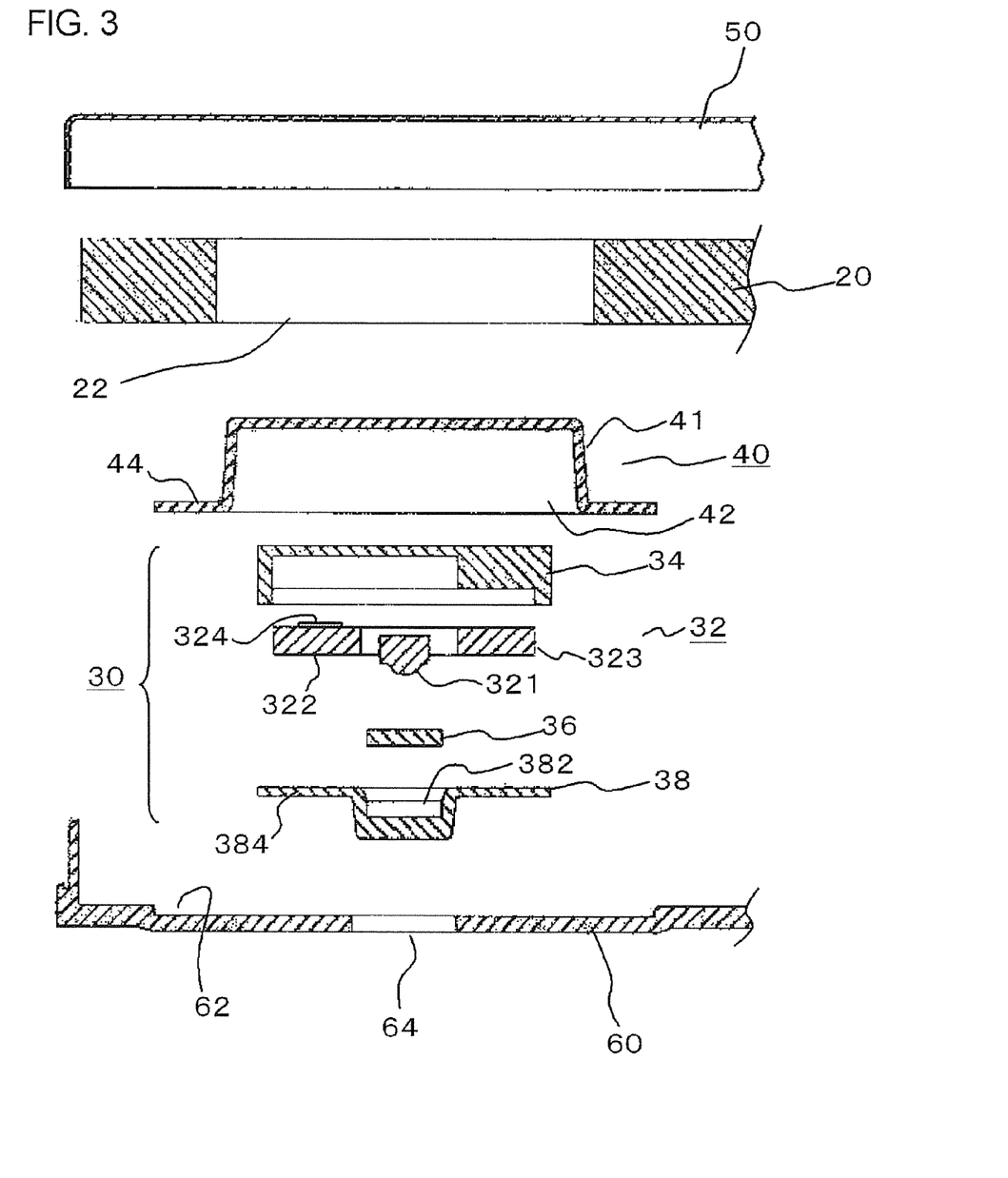
FIG. 3 is an exploded constitutional view of the electronic weighing scale.
Figure 4:
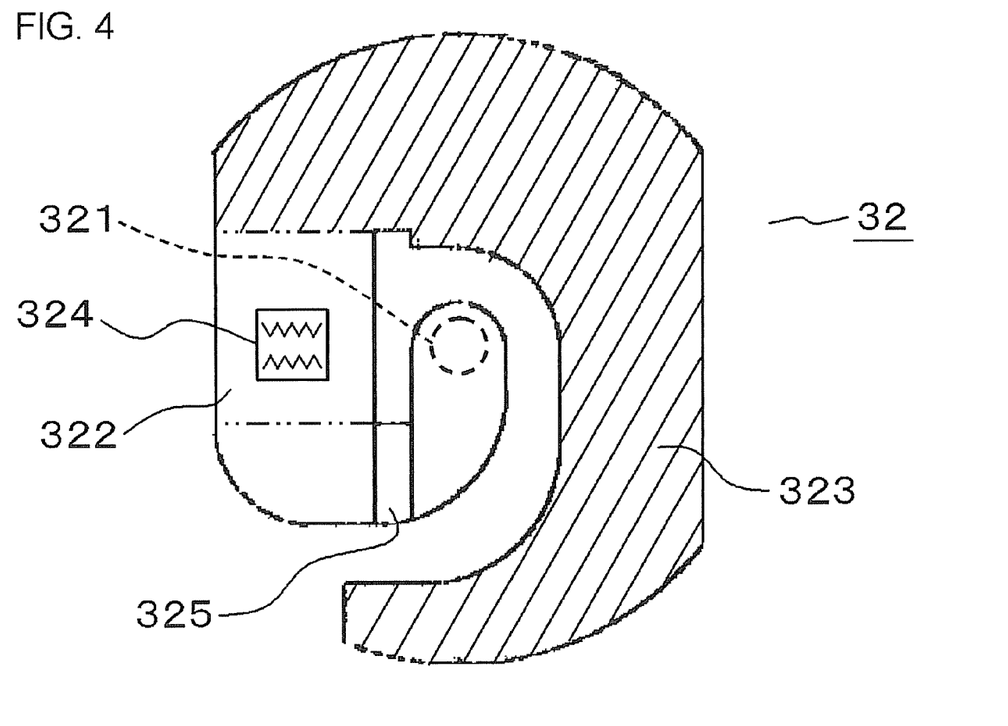
FIG. 4 is a plan view showing an exemplary strain generator used in this embodiment.

FIG. 2 is a fragmentary view taken along arrow II-II in FIG. 1A. FIG. 3 is an exploded constitutional view of the electronic weighing scale 10. FIG. 4 is a plan view of a strain generator 32 used in this embodiment.

The top plate component 20 has a nearly rectangular geometry in a plan view, and has a mounting hole 22 provided in the vicinity of each of four corners. In this embodiment, the mounting holes 22 are through-holes extending through the top plate component 20 in the thickness-wise direction, as shown in FIG. 3. To each mounting hole 22, each of four sets of load cell unit 30 is attached, while embedding the top portion thereof as a portion thereof.

The top plate component 20 may be composed of any material not specifically limited, including glass materials, metal materials, resin materials, and sandwiched materials combining them. The top plate component 20 may preferably be minimized in the thickness from the viewpoint of thinning, and may preferably has a large bending stiffness, in view of suppressing bending around the load cell units 30 when an object to be weighed is placed thereon. For this reason, the top plate component 20 may preferably be composed of a material such as tempered glass having a large specific modulus, or a sandwiched panel having a core made of urethane resin or metal honeycomb held between face panels made of metal material.

The mounting hole 22 has a circular or near-circular geometry in a plan view. By virtue of the geometry, stress concentration on the top plate component 20 upon being applied with an object to be weighed placed thereon may be avoidable, and good machinability may be ensured. The mounting hole 22 has a geometry and dimension allowed for each load cell unit 30 embedded therein. For the case where the top plate component 20 is manufactured using a tempered glass, the mounting holes 22 as the through-holes may be obtained by grinding. For the case where the top plate component 20 is manufactured using a metal plate or a sandwiched panel, the mounting hole 22 may be obtained by punching or drawing.

In the present invention, the mounting hole 22 may alternatively be a blind hole, and the mounting hole 22 in this case may be formed to a certain depth into the top plate component 20 from the lower surface thereof.

Each mounting hole 22 of the top plate component 20 is attached with the cup component 40. Each of the load cell units 30 (30a, 30b, 30c, 30d) is attached to the cup component 40.

The cup component 40 is composed of a bottomed cylinder portion 41 having an opening 42 opened downward, and a flange portion 44 provided around the opening 42. The cylinder portion 41 is allowed for attachment of the load cell unit 30 inserted therein from the lower side. Therefore, the cylinder portion 41 is formed to have the outer diameter thereof corresponded to the inner diameter of the mounting hole 22, and to have the inner diameter thereof (opening 42) larger than the outer diameter of the load cell unit 30.

The cup component 40 is attached to the top plate component 20 so that the cylinder portion 41 is embedded in the mounting hole 22, and so that the flange portion 44 is brought into contact with the lower surface of the top plate component 20.

The cup component 40 may be composed of any material not specifically limited, typically including iron-base sheet materials such as cold-rolled steel sheet (SPCC) and electro-galvanized steel sheet (SECC). The cup component 40 may be manufactured by any method not specifically limited, and may typically be obtained by drawing the above-described sheet material. Thickness of the sheet material may be 0.5 to 2 mm or around.

The load cell unit 30 may typically be composed of a base 34, a strain generator 32, a pusher 36, and a sensor cover 38 combined with each other.

The strain generator 32 used in this embodiment is composed of a spiral metal material. The spiral strain generator 32 has a push point 321 formed at the center on the tip side thereof, and has a fixing portion 323 formed on the base side. The strain generator 32 is also provided with a sensing part 322 at a straight portion between the push point 321 and the fixing portion 323. For the convenience of explanation in FIG. 4, the fixing portion 323 is hatched, and a boundary of the sensing part 322 is indicated by a two-dot chain line. The strain generator 32 is housed in the base 34, wherein the fixing portion 323 is fixed to the base 34. The region extending from the sensing part 322 towards the push point 321 is kept floated without being brought into contact with the base 34. By virtue of this configuration, the sensing part 322 may generate strain when the push point 321 is pressed upward by the pusher 36.

The sensing part 322 has a strain gauge 324 (not shown in FIG. 1A), bonded to at least either of the top surface and the lower surface thereof. The strain gauge 324 may be configured by a half bridge or a full bridge. In this embodiment, as shown in FIGS. 3 and 4, a half-bridge strain gauge 324 is bonded to the top surface side of the sensing part 322.

The strain generator 32 applicable to the present invention is not limited to that described in the above. The strain generator 32 of this embodiment, configured while keeping a step 325 between the push point 321 and the sensing part 322 as shown in FIG. 4, may alternatively be configured without providing the step between the push point 321 and the sensing part 322.

The pusher 36 is typically a disk-like plate component as shown in the drawing, and is brought into contact with the strain generator 32 only at the push point 321.

The sensor cover 38 projects downward beyond the top plate component 20, and serve as a leg when the electronic weighing scale 10 is put on the surface of placement such as floor (not shown). The sensor cover 38 is provided with a leg 382 formed as being projected downward, and a flange portion 384 surrounding it. The sensor cover 38 is composed of a resin material, wherein the flange portion 384 is formed thinner than the leg 382. The leg 382 has a recessed trench formed as being upwardly opened, allowing therein attachment of the pusher 36.

The base 34 is a member which serves as a stage when the load cell unit 30 is attached to the cup component 40, and holds the fixing portion 323 of the strain generator 32.

As shown in FIG. 2, the base 34 composing the upper portion of the load cell unit 30, and a portion of the strain generator 32 excluding the push point 321 and its periphery are embedded in the mounting hole 22. The push point 321 of the strain generator 32, the pusher 36 and the sensor cover 38 project downward beyond the top plate component 20.

Besides these components, the electronic weighing scale 10 has a supporting base 60 holding the top plate component 20, the cup components 40 and the sensor covers 38 in an integrated manner, and a cover sheet 50 attached to the supporting base 60 so as to cover the top surface of the top plate component 20.

The supporting base 60 is obtained by drawing or bending a metal sheet material. On the upper surface of the supporting base 60, there are provided recessed trenches 62 allowing therein attachment of the flange portions 44 of the cup components 40, and through-holes 64 allowing therein attachment of the legs 382 of the sensor covers 38, while being corresponded to the load cell units 30a to 30d.

Thickness of the supporting base 60 is smaller than height of projection of each leg 382 of each sensor cover 382, projected downward beyond each flange portion 384. Accordingly, each leg 382 projects downward beyond the lower surface of the supporting base 60 to thereby contact with a floor, while bringing the flange portion 384 into contact with the top surface of the supporting base 60 and holding it between the supporting base 60 and the strain generator 32.

The cover sheet 50 may be composed of a resin sheet material such as vinyl chloride sheet, stainless steel component, iron sheet or the like, and the thickness may be adjusted to 0.1 to 0.5 mm or around.

When an object to be weighed is placed on the top plate component 20, and reactive force of the dead weight thereof is applied to the sensor cover 38 and the pusher 36 from the floor, the flange portion 384 bends upward, and the push point 321 is pushed up by the pusher 36. On the other hand, the fixing portion 323 of the strain generator 32 is rigidly fixed to the top plate component 20 while placing the base 34 and the cup component 40 in between. As a consequence, the sensing part 322 pushed up on the end side (push point 321 side) thereof, while keeping the base side (fixing portion 323 side) thereof fixed, is applied with tensile force and compressive force, and thereby strain is induced. Resistors composing the strain gauges 324 may preferably be disposed respectively in a region where the sensing part 322 is applied with tensile force and in a region applied with compressive force.

Electric signals from the strain gauges 324 sensing such strain are converted into data representing mass, by a circuit unit (not shown) housed in a circuit box 80. By summing up the data corresponded to the number of sets of load cell unit 30 (four sets in this embodiment), mass of the object to be weighed may be calculated. The calculated mass is shown on a display component 70 in digital expression.

The circuit box 80 is attached to the top plate component 20. Mode of attachment is not specifically limited, wherein the circuit box 80 may typically be attached to a notched portion or a through-hole preliminarily formed in a portion of the top plate component 20. Alternatively, the circuit box 80 may be attached on the lower surface of the top plate component 20, or inside a recessed trench formed to the lower surface. In either case, height of projection of the circuit box 80 above the lower surface of the top plate component 20 is smaller than height of projection of the sensor covers 38 (38a, 38b, 38c, 38d), so that the circuit box 80 will not be brought into contact with the floor.

In this embodiment, as shown in FIGS. 1A and 1B, a notched portion is provided to the top plate component 20 in a portion thereof between the load cell units 30a and 30b, the circuit box 80 is attached thereto, and the display component 70 is disposed on the top surface side of the circuit box 80.

The display component 70 may be attached to the circuit box 80 or the top plate component 20 in a fixed form, or may be independent therefrom so as to configure a so-called separate type component. More specifically, the display component 70 and the circuit box 80 may be connected by communication based on a wireless system such as using infrared radiation, electric wave or the like, or based on a wired system such as using cord or the like, so as to allow the wall-hanging or handheld display component 70 to display thereon mass of the object to be weighed calculated by the circuit unit.

Operations and effects of the electronic weighing scale 10 of this embodiment will be explained.

The electronic weighing scale 10 of this embodiment has, as shown in FIG. 2, the mounting holes 22 extending through the top plate component 20, wherein the load cell units 30 may be attached while being embedded in the mounting holes 22. Accordingly, the electronic weighing scale 10 may be thinned by thickness corresponding to the depth of embedding of the load cell units 30, as compared with the prior art characterized by placement of the top plate component over the load cell units.

In this embodiment, the mounting holes 22 are through-holes extending through the top plate component 20 in the thickness-wise direction. To each mounting hole 22, the cup component 40 having the bottomed cylinder portion 41 having the opening 42 opened downward, and a flange portion 44 provided around the opening 42 is attached, and each load cell unit 30 is attached to the mounting hole 22 while placing the cup component 40 in between. More specifically, each cup component 40 is attached to the top plate component 20, by inserting the cylinder portion 41 into the mounting hole 22 from the lower side thereof, and by bringing the flange portion 44 into contact with the lower surface of the top plate component 20.

As has been described in the above, the electronic weighing scale 10 of this embodiment is configured rather than by composing the entire portion of the top plate component 20 with a thin sheet, but by connecting the load cell units 30 to the top plate component making use of the bearing surface of the flange portion 44 of the cup component 40, while ensuring a predetermined sufficient thickness of the top plate component 20 per se. By virtue of this configuration, the top plate component 20 will not be destroyed due to local concentration of load, even when the dead weight of the object to be weighed is applied to the load cell units 30 (bases 34) through the top plate component 20. This is because the flange portion 44 of the cup component 40 has a larger diameter, and consequently has a larger area of contact with the top plate component, as compared with the base 34 of the load cell unit 30, so that any load applied to the load cell units 30 may propagate towards the top plate component 20 in a distributed manner.

The object to be weighed placed on the top plate component 20 applies the dead weight thereof, generally to an area which contains the load cell units 30 and the cup components 40, and is consequently larger than diameters of these components. For this reason, thinning of the top plate component 20 per se may result in large bending thereof in the vicinity of the load cell units 30. If the top plate component 20 causes bending larger than the allowable limit, the dead weight of the object to be weighed may be applied obliquely to the strain generators 32 of the load cell units 30, causing error in the measurement, or in the worst case the top plate component 20 may cause plastic deformation.

In this embodiment, the above-described problem may be avoidable by imparting a sufficient level of thickness to the top plate component 20 per se so as to ensure a large bending stiffness, and by thinning the top plate component 20 only in the regions having the load cell units 30 disposed therein where the dead weight of the object to be weighed is applied vertically to the floor.

Upon placement of the object to be weighed, the cup component 40 is applied with a push-up load effected from the load cell unit 30 towards the bottom surface of the cylinder portion 41, and with a push-down load effected from the top plate component 20 towards the flange portion 44. Since the cup component 40 is applied with the loads from the upper and lower sides at positions laterally shifted from each other as described in the above, bending stress generates in the flange portion 44. For this reason, the cup component 40 is manufactured using an iron-base material or the like having large strength, so as to prevent the cup component 40 from being destroyed despite thinning of the flange portion 44.

On the other hand, if the mounting holes 22 are given as blind holes drilled from the lower surface side of the top plate component 20, but are left without being attached with the cup components 40, the top plate component 20 may be destroyed upon placement of the object to be weighed. This is because the mounting holes 22 are thinned at the bottom thereof as compared with the periphery, and also because the thinned portions of the top plate component 20 are applied in a concentrated manner with the dead weight of the object to be weighed, via the load cell units 30 (bases 34) having a still smaller footprint.

Whereas, for the case where the cup components 40 are attached to the mounting hole 22 for the purpose of avoiding destruction of thus-configured top plate component 20, the overall thinning of the electronic weighing scale 10 may inevitably be obstructed, corresponding to the thickness of the bottom surface of the mounting holes 22.

As for another case of top plate component 20 composed of a tempered glass selected from the viewpoint of its large specific modulus as described in this embodiment, it may be difficult to form the blind holes to a uniform depth with high accuracy. For the case where the mounting holes 22 are given as blind holes, the load cell units 30 may be attached obliquely to the top plate component 20, unless otherwise the bottom surfaces of which are made flat and kept in parallel with the top plate component 20. If the load cell units 30 are undesirably attached obliquely to the top plate component 20, the strain gauge may fail in correctly measuring stress of the strain generator 32 induced by the dead weight of the object to be weighed.

In contrast, the mounting holes 22 in this embodiment are given as through-holes, and the cup component 40 is composed of a flat metal sheet. As a consequence, the load cell units 30 may readily be attached upright to the top plate component 20, so as to horizontally support the top plate component 20.

Attachment of the cup components 40 to the mounting holes 22 as described in this embodiment also facilitates operations for attaching the load cell units 30 to the electronic weighing scale 10. It is no more necessary in this embodiment to attach the load cell units 30 one by one to the top plate component 20, unlike the prior art. In this embodiment, the load cell units 30 may be attached to the top plate component 20, only by preliminarily attaching each load cell unit 30 to each cup component 40, and then inserting thus-configured cup component 40 into each mounting hole 22 from the lower side thereof.

Accordingly, any load cell unit 30 went wrong may be replaced together with the cup component 40, and thereby attachment/detachment to and from the top plate component 20 may be facilitated.

By adopting the mode of attachment of the load cell units 30 to the top plate component 20 while being mediated by the cup component 40 therebetween, the top plate component 20 may be used in common even when it is desired to manufacture the electronic weighing scale 10 using the load cell units 30 differing in dimension or position of interface. More specifically, for an exemplary case where an appropriate type of load cell units 30, selected from a plurality of types differing in weighing capacity, are attached to the mounting hole 22, it may be good enough to preliminarily provide an interface suitable for such load cell units 30 to the cup components 40. By providing the mode of attachment of the cup components 40 to the top plate component 20 in common, the top plate component 20 and the mounting holes 22 may be made adoptable to general purposes.

By attaching the load cell units 30 to the mounting holes 22 while being embedded therein as described in this embodiment, the height-wise distance between the top surface of the top plate component 20 applied with the dead weigh of the object to be weighed and the strain generator may be smaller than that in the conventional electronic weighing scale.

Accordingly, even if a micro-bending is induced in the top plate component 20 upon placement of the object to be weighed, and the legs 382 of the sensor covers 38 are applied with load obliquely as a consequence, the strain generator 32 in this embodiment is applied only with a reduced moment load, and thereby the measurement error in the sensing parts 322 may be suppressed.

In the strain generator 32 of this embodiment, a region applied with load to be measured is configured by a point (push point 321), rather than a plane. The push point 321 is formed as a hemispherical projection thrust downward beyond the sensing part 322 and the fixing portion 323. The push point 321 is pushed up by the pusher 36, upon placement of the object to be weighed. In this configuration, the push point 321 may exactly be brought into contact with the pusher 36 upon placement of the object to be weighed, and strain is exactly induced in the sensing parts 322. The strain generator 32 of this embodiment has a spiral form, wherein the pusher 36 does not overlap the sensing part 322 in a plan view (see the exploded constitutional view in FIG. 3). By virtue of this configuration, the pusher 36, even in the state of pressing the push point 321, will not interfere with the sensing part 322 irrespective of the depth of pressing. The strain generator 32 of this embodiment may, therefore, ensure a sufficient length of stroke of the push points 321, and may cause a sufficient amount of deformation of the strain gauges 324 bonded to the sensing parts 322. Since the strain generator 32 has a spiral form and may be configured as a thin component as a whole, so that the electronic weighing scale 10 of the present invention may further be thinned.

This embodiment allows various modifications so far as the effects of the present invention may be achievable.

For an exemplary case where the electronic weighing scale 10 is imparted with functions of a body fat analyzer or a body composition analyzer, electrodes for supplying weak current to human body may be provided on the top surface of the top plate component 20. The cup components 40 in this case may be used as these electrodes. By allowing the cup components 40 to function as the electrodes and brackets for attaching the load cell units 30, the number of components may be reduced, and the electronic weighing scale 10 may be thinned. Because the top surfaces of the cup components 40 in this case are exposed, the cover sheet 50 may be omissible, or the cover sheet 50 may have holes in regions corresponded to the cup components 40.

In this embodiment, the strain generator 32 and the base 34 of each load cell unit 30, but excluding the push point 321, are embedded in the mounting hole 22 of the top plate component 20, without limiting the embodiment to this configuration. For example, only the bases 34 may be attached in the mounting holes 22, while leaving the strain generators 32 projected downward beyond the top plate component 20. On the contrary, the entire portion of the load cell units 30, excluding the legs 382 of the sensor covers 38, may be embedded in the mounting holes 22.

In the electronic weighing scale 10 of this embodiment, the load cell units 30 are respectively attached to the mounting holes 22 provided at four corners of the top plate component 20, where the number of sets of the load cell unit 30 is not limited to as described in the above, provided that the number is three or larger.

Figure 5A:
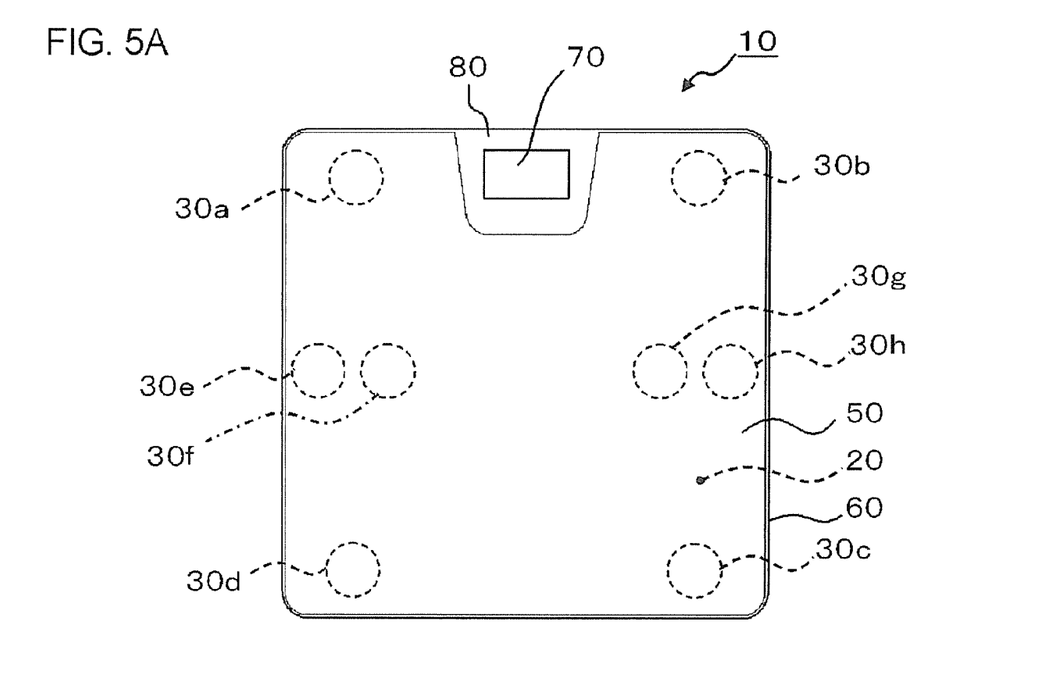
FIGS. 5A and 5B are schematic plan view and elevational view, respectively, of the electronic weighing scale according to a second embodiment of the present invention.
Figure 5B:
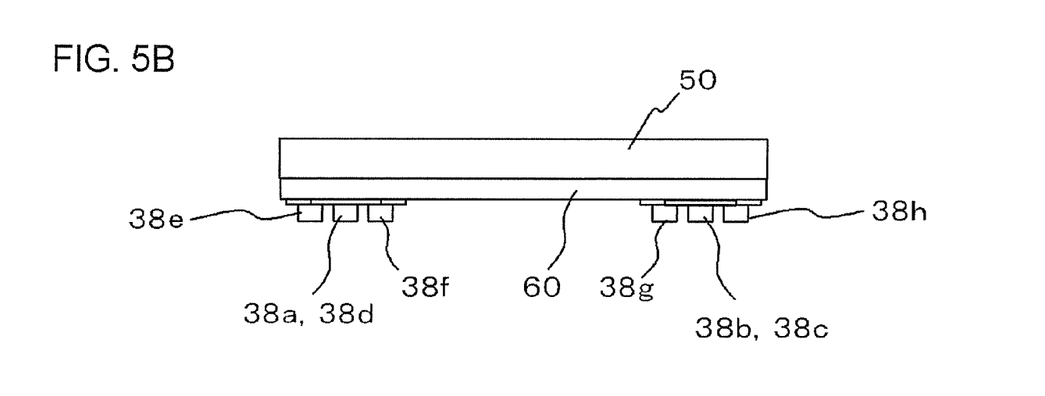

FIGS. 5A and 5B are schematic plan view and elevational view, respectively, of the electronic weighing scale 10 according to a second embodiment of the present invention.

The electronic weighing scale 10 of this embodiment has the load cell units 30 (30e to 30h) attached to the top plate component 20 at four middle positions in the longitudinal direction (vertical direction in FIG. 5A), in addition to those at four corners. By virtue of this configuration, load applied to each of the load cell units 30 (30a to 30h) may be approximately halved as compared with the first embodiment, so that destruction of the top plate component 20 and the cup components 40 may be suppressed even if they were further thinned.

The load cell units 30a, 30d, 30e, 30f are disposed in a left footprint region assuming that the object to be weighed is a human body, and the load cell units 30b, 30c, 30g, 30h are disposed in a right footprint region.

By using six or more sets of load cell unit 30 disposed in a distributed manner as in the electronic weighing scale 10 of this embodiment, mass of the object to be weighed may be applied to the load cell units 30 in a further distributed manner as compared with the electronic weighing scale 10 of the first embodiment. By attaching each of six or more sets of load cell unit 30 to each top plate component 20 while embedding at least a portion thereof in the top plate component 20, each strain generator 32 may further be downsized, the top plate component 20 may further be thinned, and thereby the electronic weighing scale 10 may further be thinned.

It is apparent that the present invention is not limited to the above embodiment, that may be modified and changed without departing from the scope and spirit of the invention.

What is claimed is:

1. An electronic weighing scale comprising:
a top plate component allowing on the top surface thereof placement of an object to be weighed; and
a plurality of load cell units supporting the top plate component from the lower side thereof,
wherein said top plate component is provided with a plurality of mounting holes,
the electronic weigh scale further comprising a plurality of cup components, wherein each cup component is built as a separate element and has a bottomed cylinder portion provided with an opening opened downward, and a flange portion provided around said opening and being attached inside said mounting hole, so that said cylinder portion is embedded in said mounting hole, and so that the flange portion is brought into contact with the lower surface of said to plate component, and
wherein each set of load cell units is attached on a bottom of said cylinder portion inside the cup component so that said each set of load cell units is attached to said mounting hole, while embedding at least a portion thereof in said top plate component.

2. The electronic weighing scale as claimed in claim 1, wherein said mounting hole is a through-hole extending entirely through said top plate component in the thickness-wise direction.

3. The electronic weighing scale as claimed in claim 1, wherein said top plate component is made of a tempered glass.

4. The electronic weighing scale as claimed in claim 1, having six or more sets of said load cell unit disposed in a distributed manner, wherein each load cell unit is attached to said top plate component, while embedding at least a portion thereof in said top plate component.

5. The electronic weighing scale as claimed in claim 1, wherein said load cell unit comprises:
a base provided on said bottom of said cylinder portion which serves as a stage when said load cell unit is attached to said cup component,
a strain generator housed in said base, and
a strain gauge bonded to said strain generator.

6. The electronic weighing scale as claimed in claim 2, further comprising a cover sheet covering both a bottom surface of said cylinder portion and said top surface of the top plate component.

7. The electronic weighing scale as claimed in claim 5, further comprising a supporting base holding said top plate component from the lower side thereof,
wherein said supporting base is provided on the upper surface thereof a recessed trench allowing therein attachment of said flange portion of the cup component, and
said supporting base is provided a through-hole extending in the thickness-wise direction allowing a bottom of the load cell unit being projected downward beyond the lower surface of the supporting base.

8. The electronic weighing scale as claimed in claim 7, further comprising a sensor cover provided with a leg formed as being projected downward, and a flange portion formed thinner than said leg and surrounding it,
wherein said recessed trench is allowing therein attachment of said flange portion of said sensor cover.

* * * * *